(12) United States Patent
Graham et al.

(10) Patent No.: US 9,586,466 B2
(45) Date of Patent: Mar. 7, 2017

(54) ENGINE CRADLE ASSEMBLY

(71) Applicant: DEERE & COMPANY, Moline, IL (US)

(72) Inventors: Brett S. Graham, Dubuque, IA (US); Mohamed Mustafa, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/746,959

(22) Filed: Jun. 23, 2015

(65) Prior Publication Data
US 2016/0375751 A1 Dec. 29, 2016

(51) Int. Cl.
*B60K 5/00* (2006.01)
*B62D 21/11* (2006.01)
*B62D 21/18* (2006.01)
*E02F 9/08* (2006.01)

(52) U.S. Cl.
CPC ............... *B60K 5/00* (2013.01); *B62D 21/11* (2013.01); *B62D 21/18* (2013.01); *B62D 21/186* (2013.01); *E02F 9/0866* (2013.01)

(58) Field of Classification Search
CPC ....... E02F 9/0866; B62D 21/11; B62D 21/18; B62D 21/186; B60K 5/00; B60K 5/02
See application file for complete search history.

(56) References Cited

U.S. PATENT DOCUMENTS

| | | | | |
|---|---|---|---|---|
| 3,895,728 A * | 7/1975 | Heggen | ..................... | B60D 1/50 180/89.12 |
| 4,055,262 A * | 10/1977 | Bauer | ....................... | B60P 1/50 180/89.12 |
| 4,449,606 A * | 5/1984 | Buschbom | ........... | B60K 7/0015 180/212 |
| 4,815,550 A * | 3/1989 | Mather | .................. | B60K 11/00 123/41.49 |
| 6,108,907 A * | 8/2000 | Anderson | ............ | B62D 21/186 180/291 |
| 6,138,786 A | 10/2000 | Anderson et al. | | |
| 6,167,980 B1 | 1/2001 | Anderson et al. | | |
| 7,735,594 B2 * | 6/2010 | Hidaka | .................. | B62D 49/06 180/311 |
| 7,866,700 B2 * | 1/2011 | Weibling | ............. | B62D 21/186 180/299 |
| 8,821,104 B2 * | 9/2014 | Yasuda | ................. | E02F 3/3405 248/49 |

(Continued)

*Primary Examiner* — Laura Freedman
(74) *Attorney, Agent, or Firm* — Taft Stettinius & Hollister, LLP; Stephen F. Rost

(57) ABSTRACT

A cradle assembly includes a body having a front end, a rear end, a first side, a second side, and a length defined between its front end and rear end. The body has a first elongated member disposed along the first side of the body between its front and rear ends and a second elongated member disposed along the second side of the body between its front and rear ends. The body has a pump mount positioned at the front end and coupled between the first member and the second member. A flywheel cover is coupled between the first member and the second member at a location between the front end and rear end. The body also has a coupling mechanism disposed at its rear end and coupled between the first member and the second member, the coupling mechanism adapted to be coupled to a chassis of a work machine.

20 Claims, 8 Drawing Sheets

(56) References Cited

U.S. PATENT DOCUMENTS

| | | | |
|---|---|---|---|
| 8,919,486 B2* | 12/2014 | Nakagami | E02F 9/0866 180/309 |
| 2008/0078917 A1 | 4/2008 | Roehrl et al. | |
| 2013/0220720 A1* | 8/2013 | Iizuka | B60K 5/12 180/65.26 |

* cited by examiner

ENGINE CRADLE ASSEMBLY

FIELD OF THE DISCLOSURE

The present disclosure relates to a machine, and in particular, to a body that couples an engine to a chassis of the machine.

BACKGROUND OF THE DISCLOSURE

Work machines, such as those in the agricultural, construction and forestry industries, perform a variety of operations. In some instances, a work machine includes a combination of hydraulic, mechanical, and electrical systems that utilize an internal combustion engine to provide the primary power to the many moving parts of the work machine. The work machine may have a drive system that allows the work machine to be movable on a drive surface. A typical work machine may also employ a work implement or tool to perform a desired function. The work implement or tool, such as a bucket, forklift, or grapple, is movably coupled to a chassis of the machine by a mechanical linkage, which may include a lift arm or boom, and controlled through the hydraulic and mechanical systems of the work machine. The linkage and the drive system are operably controlled by a machine operator using the controls of the machine.

In one instance, the machine may have an internal combustion engine coupled to the chassis. The engine may be coupled to the chassis to provide hydraulic, electrical, and mechanical power. The engine may be designed to operate between minimum and maximum working ranges, and allow the operator to provide inputs that allow the engine to utilize the appropriate working range for the operator's needs. Each particular working range may also create a vibration profile in the machine. The particular vibration profile may be created, in part, by the rotation speed of the engine and any rotational imbalances in the engine. Further, the particular mounting locations and structural integrity of the mounting material affects the vibration profile experienced by the machine. In certain instances, the vibration profile may cause significant vibrational forces on the different components of the machine, causing wear or stress on these components or requiring more expensive or complex designs for these components so that they are capable of withstanding such vibrational forces.

A machine is provided herein, and in particular, an engine mounting assembly for the machine that can reduce the vibrational forces created by the engine when it is operating between its minimum and maximum working range.

SUMMARY

In one embodiment, a cradle assembly for mounting an engine and pump assembly to a machine is taught. The cradle assembly may have a body including a front end, a rear end, a first side, and a second side, the body having a length defined between its front end and rear end. There may be a first elongated member disposed along the first side of the body between the front end and the rear end and a second elongated member disposed along the second side of the body between the front end and the rear end. Further, a pump mount may be positioned at the front end of the body and coupled between the first member and the second member, the pump mount adapted to be coupled to the pump assembly. A flywheel cover may also be coupled between the first member and the second member at a location between the front end and rear end, the flywheel cover may also be adapted to be coupled to the engine. Additionally, a coupling mechanism may be disposed at the rear end of the body and coupled between the first member and the second member, the coupling mechanism adapted to be coupled to the machine.

In yet another embodiment, the cradle assembly may have a first isolator assembly and a second isolator assembly, the first isolator assembly being coupled to the flywheel cover and the second isolator assembly being coupled to the coupling mechanism. Wherein the first isolator assembly is adapted to isolate the flywheel cover from the machine and the second isolator assembly is adapted to isolate the body from the machine. The coupling mechanism may have a substantially planar plate coupled to the second isolator assembly, a first wall integrally formed with the plate and being oriented at an angle with respect to the plate, the first wall coupled to the first member, and a second wall integrally formed with the plate and being oriented at an angle with respect to the plate, the second wall coupled to the second member. Further, the first wall and second wall may taper inwardly towards one another at the front end of the body. Additionally, the first wall and the second wall each may include a defined length, the first wall and second wall further may include a transverse bend defined at a location along its respective length. The first wall and the second wall may have at least two transverse bends defined therein along each respective length wherein the second isolator is disposed between the front end of the body and the first and second side walls.

In one embodiment, the first member has a plurality of sections including at least a first section, a second section and a third section and the second member has a plurality of sections including at least a first section, a second section, and a third section. In this embodiment, the second section of the first member and the second section of the second member are disposed substantially parallel to one another. The first section of the first member and the first section of the second member may also be coupled to the coupling mechanism at the front end of the body. Additionally, the first section of both members may taper inwardly from the respective second section of each member towards the front end.

In yet another embodiment, the third section of the first member and the third section of the second member may be coupled to the pump mount at the rear end of the body and the third section of both members may taper inwardly from the respective second section of each member towards the rear end. The flywheel cover may also be coupled to the second section of both the first member and the second member.

In another embodiment, the flywheel cover may have a substantially annular body defining an opening therein, the annular body may have a first thickness spaced from the opening by a first distance and a second thickness spaced from the opening by a second distance. The first thickness may be greater than the second thickness, and the first distance may be less than the second distance. The thickness of the annular body may decreasingly taper from the first thickness to the second thickness.

In yet another embodiment, the cradle assembly may have a first isolator assembly, a second isolator assembly, and a third isolator assembly, the third isolator assembly being coupled to the coupling mechanism and adapted to isolate the body from the machine. In this embodiment, the flywheel cover may have a pair of tabs protruding from the annular body and being radially spaced from one another, where one of the pair of tabs is coupled to the first isolator assembly and the other of the pair of tabs is coupled to the second isolator assembly, the first and second isolator assemblies adapted to isolate the flywheel cover from the machine.

In a further embodiment, a cradle assembly is provided for mounting an engine and pump assembly to a chassis of a work machine. The cradle assembly includes an elongated body having a front end and a rear end, the body having a defined length between its front end and rear end; a first member disposed along one side of the body between the front end and the rear end; a second member disposed along another side of the body between the front end and rear end, the second member spaced laterally from the first member; a pump mount coupled at the front end to the first member and the second member, the pump mount adapted to be coupled to the pump assembly; a coupling mechanism coupled to the first and second members at the rear end of the body, the coupling mechanism adapted to be coupled to the chassis; a flywheel cover adapted to be coupled to the engine, the flywheel cover coupled between the first member and the second member at a location along the body between the front and rear ends, the flywheel cover including an annular body defining an opening therethrough, wherein a longitudinal axis is defined along the length of the body and through the opening between the front end and rear end; and a first isolator assembly and a second isolator assembly, the first isolator assembly being coupled to the coupling mechanism and adapted to isolate the body from the chassis, and the second isolator assembly being coupled to the flywheel cover and adapted to isolate the flywheel cover from the chassis.

In one example of this embodiment, the annular body comprises a first thickness spaced radially from the opening by a first distance and a second thickness spaced radially from the opening by a second distance, the first thickness being greater than the second thickness, and the first distance being less than the second distance; further wherein, the thickness of the annular body decreasingly tapers from the first thickness to the second thickness. In a second example, the first member and the second member are integrally formed as single structural members that interconnect the pump mount and the coupling mechanism. In a third example, the flywheel cover comprises a pair of tabs protruding from the annular body and being radially spaced from one another; and the second isolator assembly comprises at least two second isolator assemblies, wherein one of the pair of tabs is coupled to one of the two second isolator assemblies and the other of the pair of tabs is coupled to the other of the two second isolator assemblies.

In a fourth example of this embodiment, the first member includes a plurality of sections including at least a first section, a second section and a third section; the second member comprises a plurality of sections including at least a first section, a second section, and a third section; further wherein, the second section of the first member and the second section of the second member are disposed parallel to one another. In a fifth example, the first section of each member tapers outwardly from the coupling mechanism to the respective second section of each member; and the third section of each member tapers inwardly from the second section of each member to the pump mount.

In a different embodiment, a work machine includes a chassis; at least one ground-engaging mechanism coupled to the chassis; a cab mounted to the chassis; an engine assembly for providing power to propel the machine; a pump assembly coupled to an output of the engine assembly; and a cradle assembly. The cradle assembly includes a body including a front end, a rear end, a first side, and a second side, the body having a length defined between its front end and rear end; a first elongated member disposed along the first side of the body between the front end and the rear end; a second elongated member disposed along the second side of the body between the front end and the rear end; a pump mount positioned at the front end of the body and coupled between the first member and the second member, where the pump assembly is coupled to the pump mount; a flywheel cover coupled between the first member and the second member at a location between the front end and rear end, where the engine assembly is coupled to the flywheel assembly; and a coupling mechanism disposed at the rear end of the body and coupled between the first member and the second member, where the cradle assembly is coupled to the chassis via the coupling mechanism.

In one example of this embodiment, the flywheel cover includes a substantially annular body defining an opening therein for receiving at least a portion of the engine assembly, the annular body having a first thickness spaced radially from the opening by a first distance and a second thickness spaced radially from the opening by a second distance, where the first thickness is greater than the second thickness and the first distance is less than the second distance; further wherein, the thickness of the annular body decreasingly tapers from the first thickness to the second thickness.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
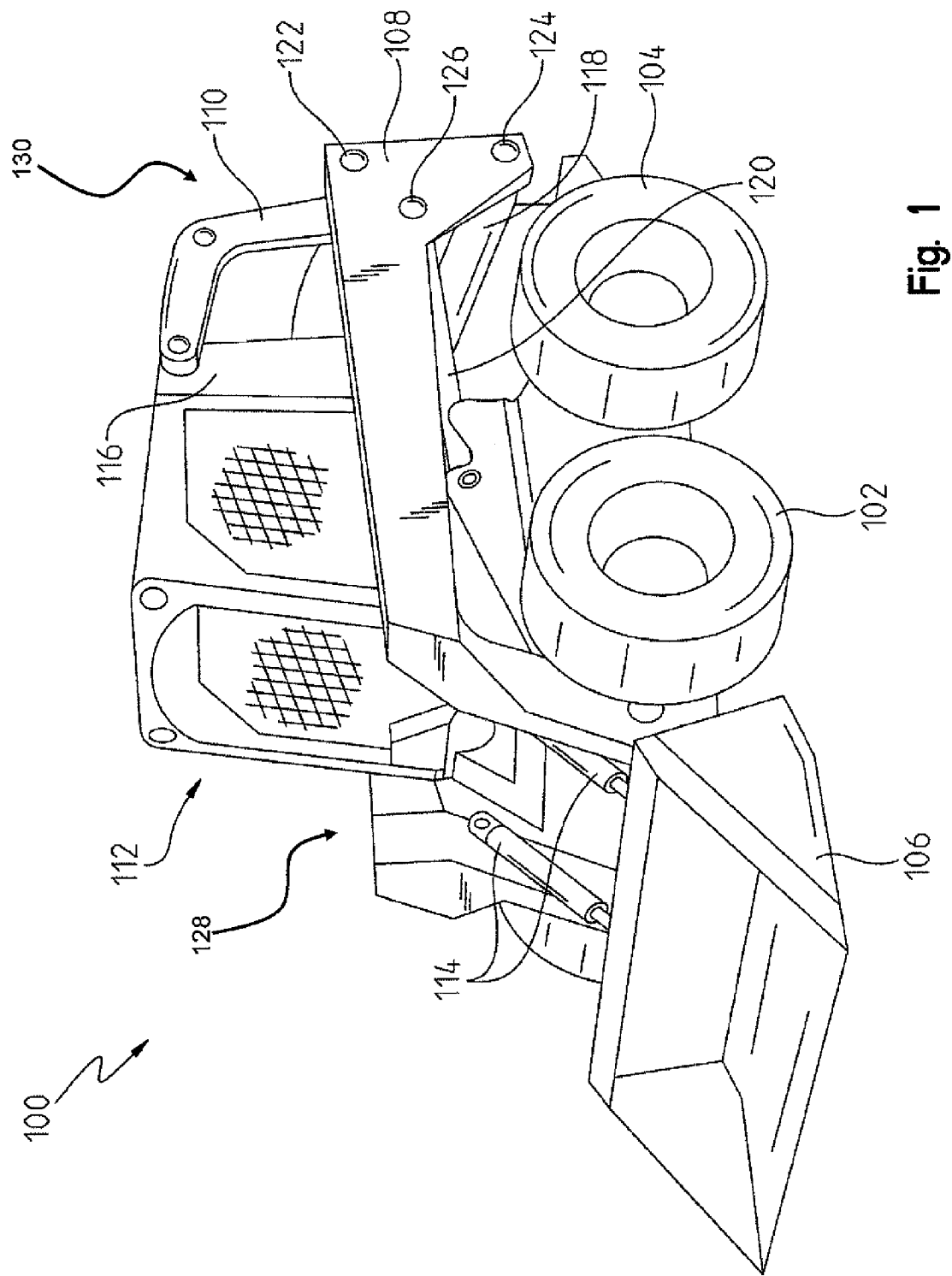
FIG. 1 is a side perspective view of a skid steer loader machine.

Referring to FIG. 1, an embodiment of a machine 100, such as a skid steer loader, is shown. This disclosure is not intended to be limited to a skid steer loader, however, but may also include any agricultural, construction, or forestry machinery. The machine 100 may have a front end 128 and a rear end 130 and can be provided with a ground-engaging mechanism for moving along the ground. In FIG. 1, the ground-engaging mechanism may be a pair of front wheels 102 and a pair of rear wheels 104. In another aspect, such as a compact track loader, the ground-engaging mechanism can be a drive track disposed on each side of the machine 100. In a conventional skid steer, the operator can manipulate controls from inside a cab 112 to drive the wheels on the right or left side of the machine 100 at different speeds to thereby control the machine 100 in a conventional manner.

The machine 100 can be further provided with a work implement or tool for performing a desired operation. In FIG. 1, the machine 100 includes a loader bucket 106 for collecting material therein and transporting said material to a desired location. The loader bucket 106 can be pivotally coupled to a forward portion of a pair of boom arms 108 positioned on each side of the machine 100. A pair of bucket tilt hydraulic actuators 114 can extend between the bucket 106 and the boom arms 108 for controlling the tilted orientation of the bucket 106 with respect to the boom arms 108. Each hydraulic actuator 114 can include a cylinder rod that actuates back and forth within a cylinder in response to a change in hydraulic pressure. By actuating the tilt hydraulic actuators 114, the operator can tilt the bucket 106 for collecting material therein or dumping material therefrom.

In FIG. 1, the loader bucket 106 is shown at ground level. To raise the bucket 106, each of the pair of boom arms 108 is connected to an upper link 110 at a first pivot 122 and a lower link 118 at a second pivot 124. The upper link 110 and lower link 118 are also attached to a main chassis 116 of the machine 100 at opposite ends of where each connects to the boom arm 108. A hydraulic actuator 120 is pivotally secured at one end to the main chassis 116 and coupled to the boom arm 108 at an opposite end thereof. The hydraulic actuator 120 connects to the boom arm 108 at a third pivot 126.

Figure 2:
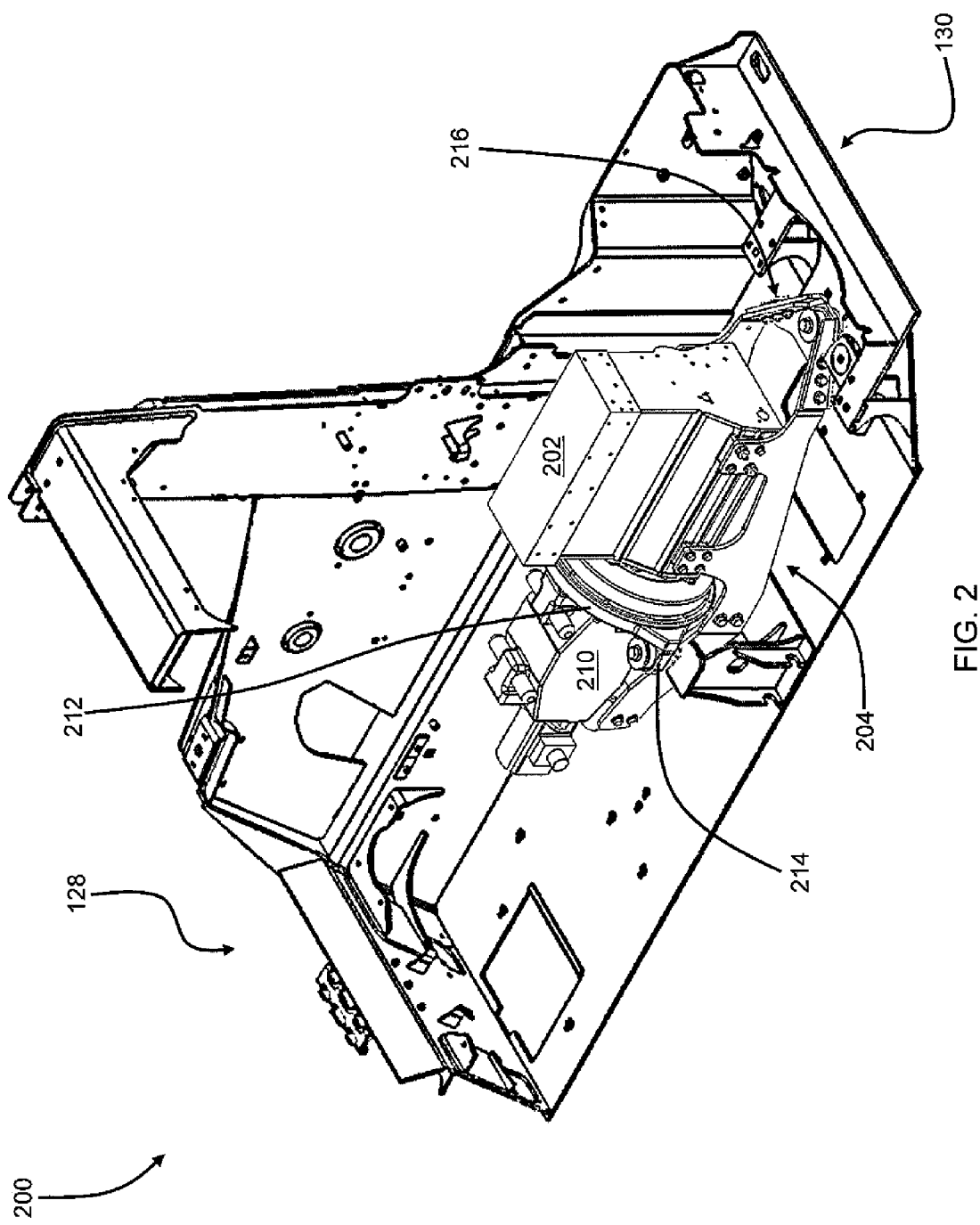
FIG. 2 is a partial perspective view of the embodiment of FIG. 1 with a side wall and several accessories removed.

Referring now to FIG. 2, a partial perspective view 200 of the machine 100 is shown. The machine 100 may define an inner cavity that is adapted to receive an engine 202. The engine 202 may further be coupled to the machine 100 through a body 204 extending from the rear end of the machine 100 towards the front end 128 of the machine 100. Additionally, the body 204 may provide for mounting locations for a pump assembly 210 and a flywheel cover 212.

The flywheel cover 212 may have a substantially annular body and be coupled to the engine 202. The flywheel cover 212 may define at least one tab 214 that provides a location to couple the flywheel cover 212 to the work machine 100. Further, the flywheel cover 212 may also be coupled to the body 204 along a lower portion of the flywheel cover 212. In the non-limiting embodiment shown in FIG. 2, the body 204 may also be coupled to the machine 100 by a coupling mechanism 216 near the rear end 130. The body 204 may be partially supported by the coupling mechanism 216 at the rear end 130 and further through the tabs 214 of the flywheel cover 212 towards the front end 128. That is to say, the flywheel cover 212 may be coupled to the machine 100 by the tabs 214 and further coupled to a portion of the body 204 to partially support the body 204.

Figure 3:
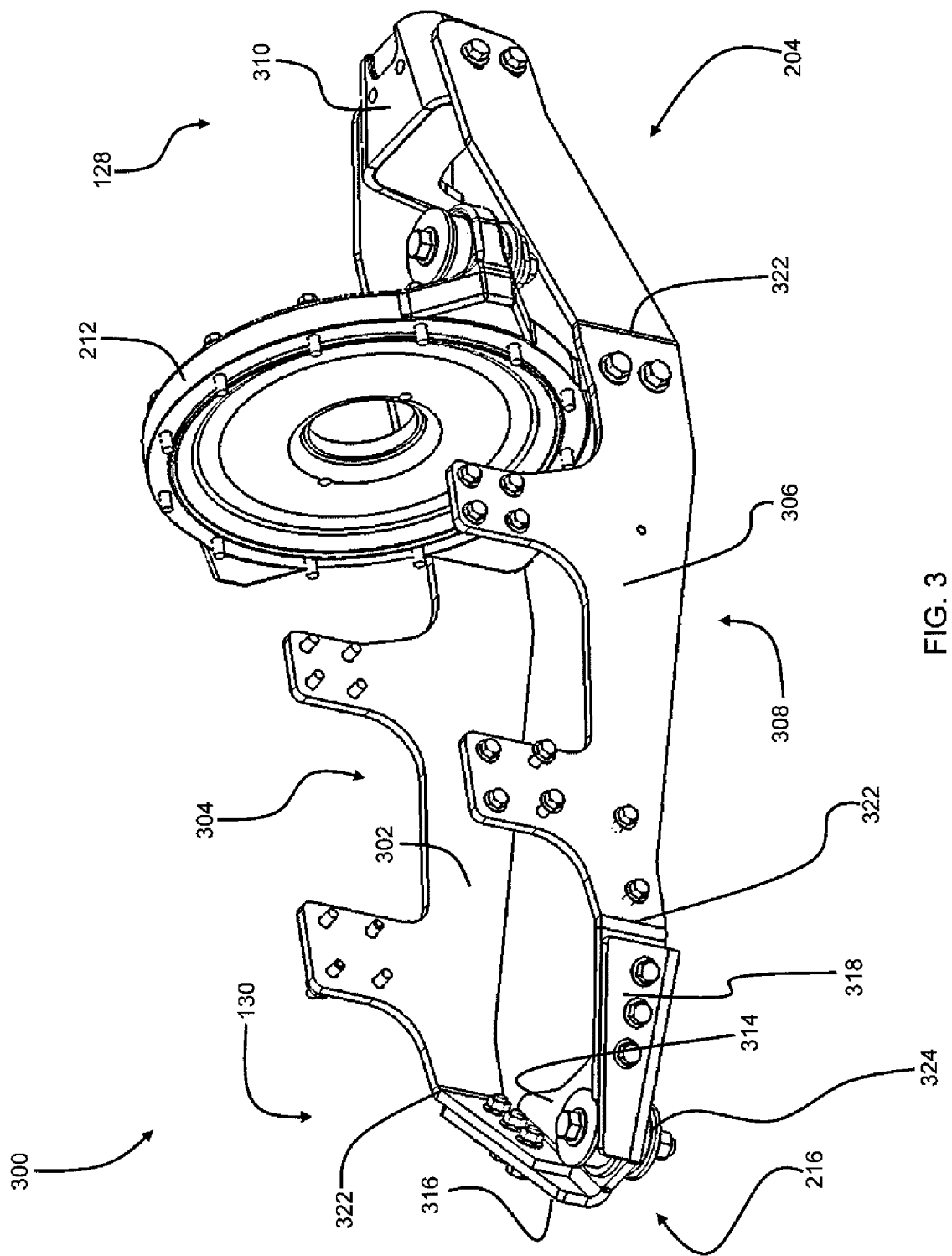
FIG. 3 is a perspective view of an isolated engine cradle assembly.

Referring now to FIG. 3, a perspective view 300 of the body 204 is shown isolated from the machine 100. The body 204 may have a first elongated member 302 along a first side 304 and a second elongated member 306 along a second side 308. The first member 302 and the second member 306 may be coupled to one another at the rear end 130 through the coupling mechanism 216. The first member 302 can extend from the rear end 130 along the first side 304 of the body 204 and terminate at a pump mount 310 at the front end 128. Similarly, the second member 306 can extend from the rear end 130 along the second side 308 of the body 204 and terminate at the pump mount 310 at the front end 128. In one non-limiting example, the second member 306 may be a substantially mirrored embodiment of the first member 302.

FIG. 3 also more clearly shows the coupling mechanism 216. The coupling mechanism 216 may couple the first member 302 to the second member 306 while further defining a coupling mount that allows the coupling mechanism 216 to couple to the machine 100. In one embodiment, the coupling mechanism 216 may be a substantially single material formed into a planar plate 314, a first wall 316, and a second wall 318. The first wall 316 and the second wall 318 may be angularly offset from one another to correspond with the angle in which the first member 302 and the second member 306 are angled toward the coupling mechanism 216. Further, first wall 316 and the second wall 318 may be formed by bends relative to planar plate 314 so as to enable them to lay flat against first member 302 and second member 306, which are substantially 90 degree bends in the embodiment shown in FIG. 3. The first wall 316 and the second wall 318 may be sized to correspond with the portions of the first and second members 302, 306 that couple to the coupling mechanism 216.

The first and second members 302, 306 may be coupled to the coupling mechanism 216 using a plurality of different coupling methods, and this disclosure is not limited to any one coupling method. More specifically, the first and second members 302, 306 may have through holes that correspond to through holes in the coupling mechanism 216. The through holes may be aligned with one another and a coupling mechanism such as a bolt and nut, rivet, or any other similar coupling means may be used to couple the first and second members 302, 306 to the coupling mechanism 216. Alternatively, the coupling mechanism 216 may be welded or adhered to the first and second member 302, 306 when they are properly aligned with one another.

In yet another embodiment, the first member 302, the second member 306, and the coupling mechanism 216 may be formed from one continuous material. Instead of coupling the components to one another, the single material may be cut, machined, bent, or otherwise formed to create the desired shape of the overall body 204. A person having skill in the art will understand the various methods that may be used to create substantially the same features described for the body 204, and this disclosure is not limited to any one method.

In one embodiment, an isolator 324 may be disposed between the coupling mechanism 216 and the machine 100. The isolator 324 may be a plurality of materials designed to dampen the vibration transferred between the engine 202 and the remainder of the machine 100. One skilled in the art is aware of the plurality of different materials and methods that may be utilized for mechanical isolators and this disclosure is not limited to any particular type. Materials such as rubber, polyurethane, plastic and the like may be utilized and are incorporated herein as non-limiting examples of an isolator. Further, mechanical assemblies such as dampeners and shock absorbers are also considered herein. As such, isolator may be a single piece of material or it may include additional materials or components. Thus, in this disclosure, isolator assembly is used in place of isolator but the terms may be used interchangeably. This disclosure contemplates the use of any known isolator or isolator assembly for isolating two or more structures (e.g., engine and chassis of a machine) from one another.

The perspective view 300 more clearly shows how the first and second members 302, may be formed by having a plurality of transverse bends 322. More specifically, transverse bends 322 may be formed in both the first and second members 302, 306 near the location at which they are coupled to the coupling mechanism 216. The transverse bends 322 may allow for the first and second members 302, 306 to become tapered inwardly toward one another near the coupling mechanism 216.

Additionally, the first and second members 302, 306 may have a transverse bend 322 at a location proximate to the flywheel cover 212. The transverse bend 322 allows the first and second members 302, 306 to taper inwardly towards one another as they approach the pump mount 310 at the front end 128. In one embodiment, tapering the first and second members 302, 306 towards one another as they approach the pump mount 310 may allow for sufficient clearance between the first and second members 302, 306 and the surrounding structure of the machine 100 to provide routing options for hydraulic hoses.

This disclosure, however, is not limited to a tapered pump mount section and other routing options for hydraulic hoses are available. For example, the first and second members 302, 306 may not have a transverse bend 322 but rather may be substantially straight. In this embodiment, the first and second members 302, 306 may have through-holes defined adjacent to the pump assembly 210 to allow for routing hydraulic lines therethrough. Further, in yet another embodiment, the first and second members 302, 306 may be substantially straight along the pump mount section and may not have any through holes therethrough. In this embodiment, the hydraulic lines may not need to be routed underneath the pump assembly 210.

The pump mount 310 can be disposed between the first member 302 and the second member 306 at the front end 128 of the body 204. The pump mount 310 may also provide a location to support the pump assembly 210 or any other accessory that may be coupled to the engine 202. In one embodiment, the pump mount 310 may be formed from substantially one planar piece that has a series of bends. The pump mount 310 may also have a reinforcement plate (as shown in an underside perspective view 500 of FIG. 5) coupled along the inner surface of the pump mount 310. The reinforcement plate 502 may provide increased rigidity to the pump mount 310 and thereby reduce the amount of vibration transferred from the engine 202 to the pump assembly 210 mounted thereto.

Figure 4:
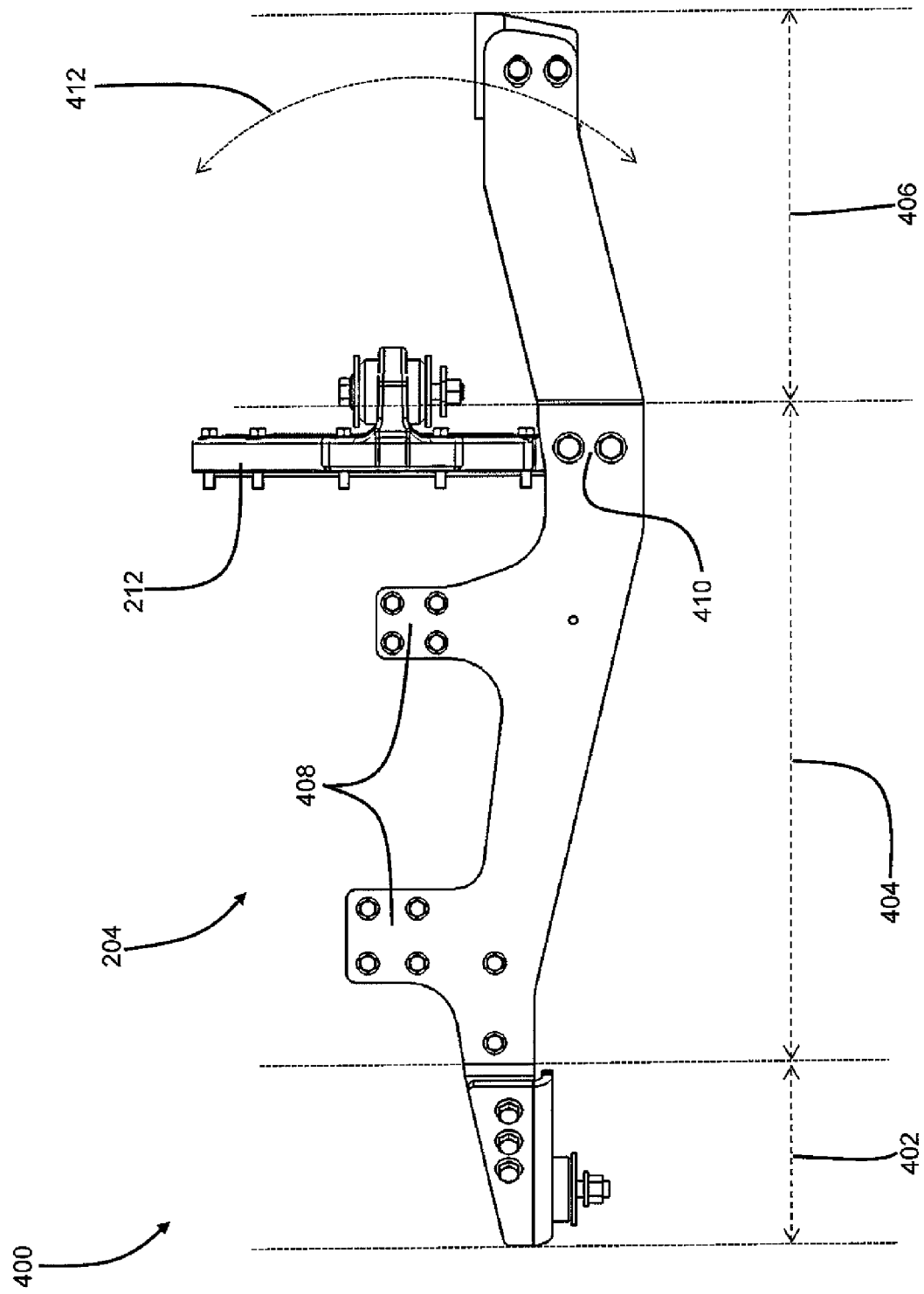
FIG. 4 is a side view of the isolated engine cradle assembly of FIG. 3.

The transverse bends 322 may define several sections that can be more clearly understood with reference to the side view 400 of FIG. 4. More specifically, FIG. 4 illustrates a first section 402, a second section 404, and a third section 406. The first section 402 may transition to the second section 404 in both the first member 302 and the second member 306 through a transverse bend 322. Further, the first section 402 of the first and second member 302, 306 may be coupled to the coupling mechanism 216. That is to say, the transverse bend 322 between the first section 402 and the second section 404 may be sufficient to allow the inward taper of the first member 302 and the second member 306 to correspond with the first wall 316 and the second wall 318 of the coupling mechanism 216.

In one embodiment, the first member 302 and the second member 306 are parallel to one another along the second section 404. In yet another embodiment, the flywheel cover 212 may be mounted to the first and second member 302, 306 in the second section 404. In this embodiment, the first and second member 302, 306 may be substantially parallel to one another throughout the second section 404 while coupling to the engine 202 and the flywheel cover 212.

While the first and second members 302, 306 have been described as being parallel to one another along their respective second sections 404, this disclosure is not limited to such a configuration. More specifically, the second section 404 of each member may include portions that are offset from one another, requiring intermediate bends along the second section 404. Further, while one embodiment teaches mounting the flywheel cover 212 being coupled to or positioned in the second section 404, the flywheel cover 212 may also be mounted in the first section 402 or the third section 406.

As disclosed herein, there are manufacturing advantages of having the flywheel cover 212 couple to the body 204 at locations that are in planar alignment with engine coupling points 408, i.e., where the engine can be coupled to the body 204. More specifically, such alignment may allow the second section 404 of each of the first and second member 302, 306 to be substantially planar pieces, not requiring an additional manufacturing step of bending or forming the second section 404 as the first and second members 302, 306 extend from the engine 202 to the flywheel cover 212. However, having one or more bends within the second section 404 does not stray from the teachings of this disclosure. Accordingly, this disclosure is not limited to parallel members disposed along the second section 404.

The relationship between at least one engine coupling point 408 and at least one flywheel coupling point 410 are more clearly illustrated in the side view 400 of FIG. 4. The at least one flywheel coupling point 410 represents a location where the flywheel cover 212 may couple to the body 204. In one embodiment, the flywheel cover 212 may be coupled to the second section 404 at a location along a lower portion of the flywheel cover 212. By coupling the flywheel cover 212 at its lower portion, the flywheel cover 212 may be rigid enough to substantially restrict the pump assembly 210 from deflecting relative to the engine 202 when coupled thereto.

In one nonexclusive embodiment, the flywheel coupling point 410 may provide additional support along the body 204 to substantially restrict the pump assembly 210 from oscillating or otherwise deflecting relative to the flywheel cover 212. The flywheel coupling point 410 may further stiffen the body 204 to reduce deflection between the flywheel cover 212 and the pump assembly 210 along a substantially vertical direction as shown by arrow 412 in FIG. 4. However, deflection may be reduced in other directions as well. For example, the body 204 may also substantially restrict deflection between the pump assembly 210 and the flywheel cover along a side-to-side or lateral direction. Additionally, the body 204 may substantially restrict deflection along any combination of directions and this disclosure is not limited to any particular direction.

Figure 10:
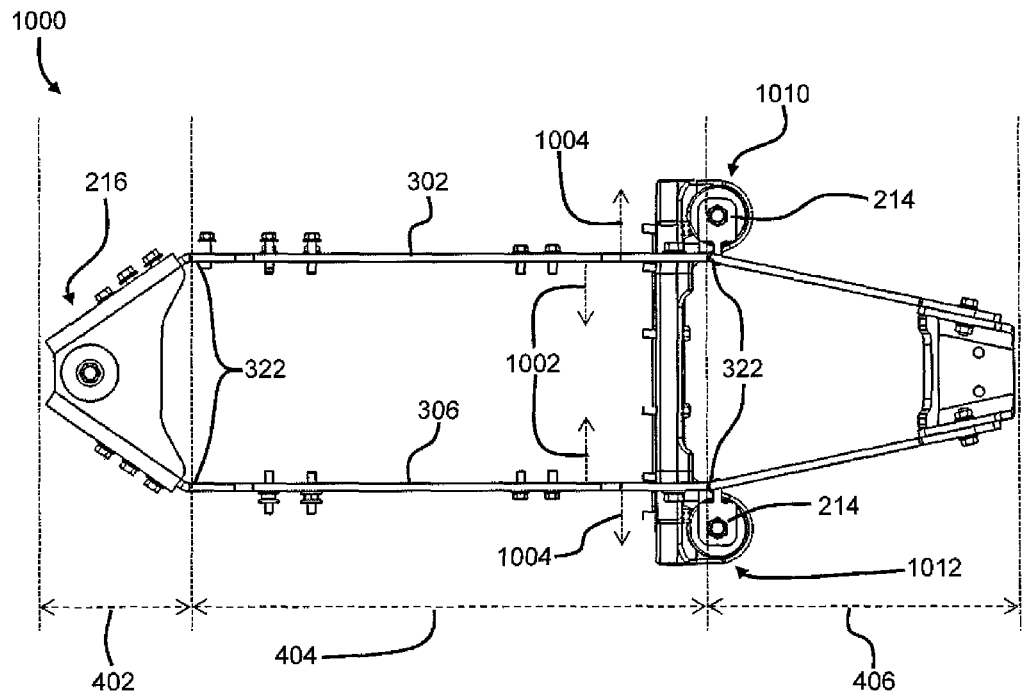
FIG. 10 is an underside view of the engine cradle of FIG. 3.

The flywheel coupling point 410 may also restrict the first and second member 302, 306 from deflecting in an inward direction 1002 or an outward direction 1004 (see FIG. 10). By reducing the potential deflection of the first and second member 302, 306 in the inward and outward direction 1002, 1004, the overall stiffness and rigidity of the body 204 and the components coupled thereto may be enhanced. By increasing the rigidity of the body 204 and by coupling the pump assembly 210 to the body 204 via the pump mount 310, the pump assembly 210 may be substantially restricted from deflecting or otherwise oscillating relative to the flywheel cover 212.

Figure 6:
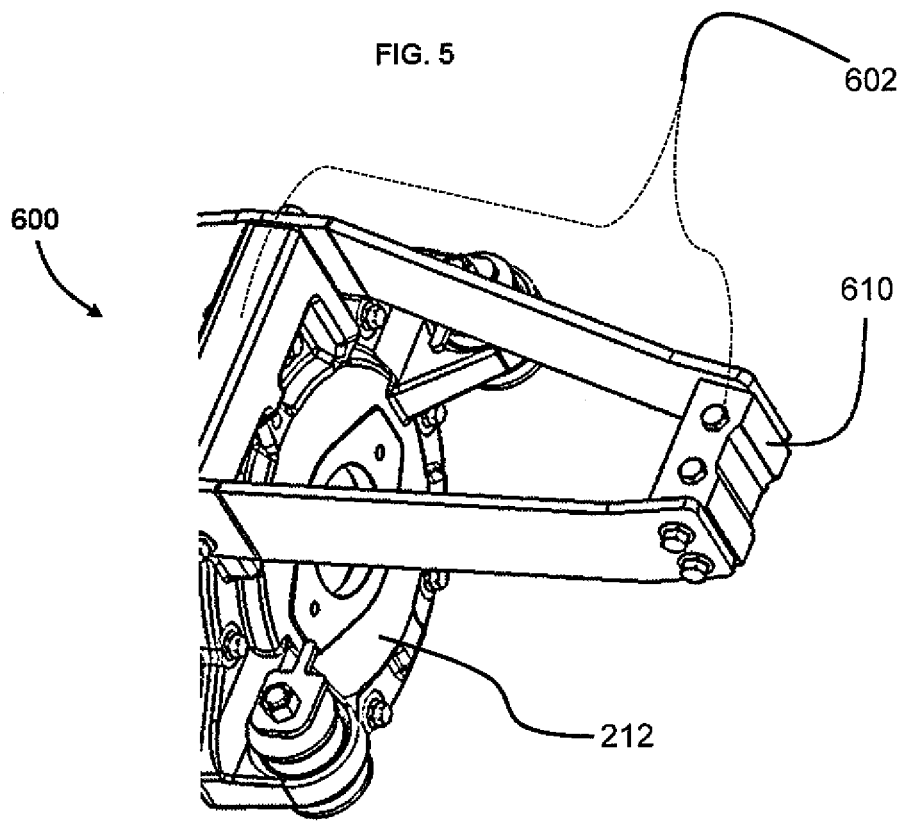
FIG. 6 is an underside partial perspective view of a different embodiment of a pump assembly mount.

Referring now to FIG. 6, a perspective underside view 600 of the body 204 illustrates an alternative pump mount 610. In the alternative embodiment, the pump mount 610 may be formed of a single block of material rather than a piece including a plurality of bends as described in the previous embodiment of the pump mount 310. The single block pump mount 610 may define a plurality of mounting holes disposed to couple the pump mount 610 to the first and second members 302, 306. In the single block pump mount 610, the distance between the flywheel cover 212 and the pump mount 610 may be greater than the distance from the flywheel cover 212 to the pump mount 310 in the previous embodiment. In one embodiment, the distance between the pump mount and the flywheel cover 212 may be altered to accommodate different accessories that are being driven by the engine 202. In a non-limiting example, a mechanical hydraulic pump may require the pump mount 610 to be spaced a first distance from the flywheel cover 212 while an electrical hydraulic assembly may require the pump mount 610 to be spaced a different distance from the flywheel cover 212. The distance between the pump mount and the flywheel cover 212 can be different in other embodiments without affecting the teachings of this disclosure.

Figure 7:
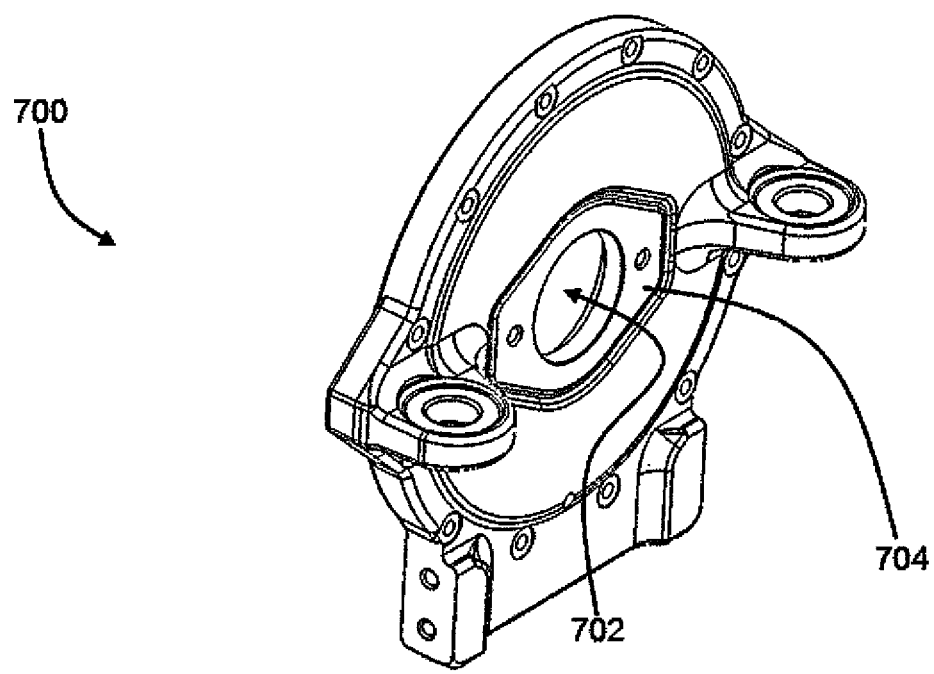
FIG. 7 is a an isolated perspective view of a flywheel cover.

Referring now to FIG. 7, an isolated perspective view 700 of the flywheel cover 212 is shown. The flywheel cover 212 may have a substantially annular body defining an opening 702 that may align with a crankshaft of the engine 202. When the flywheel cover 212 is coupled to the engine 202, a flywheel of the engine 202 may freely rotate within the cavity created between the flywheel cover 212 and the engine 202. Further, a shaft may be disposed through the opening 702 to transmit torque produced by the engine 202 to the pump assembly 210.

In addition to mounting the pump assembly 210 to a pump mount (310 or 610), the pump assembly 210 may also be coupled to an outer surface of the flywheel cover 212 via a mounting surface 704. By coupling the pump assembly 210 to the flywheel cover 212, the pump assembly 210 may be disposed in proper alignment with the crankshaft of the engine 202 while also providing a structural coupling point between the pump assembly 210 and the engine 202. Accordingly, the rigidity of the flywheel cover 212 may reduce the vibration of the engine 202 and pump assembly 210.

Another aspect of the present disclosure is a modified or varying thickness of the flywheel cover 212 to create a more rigid connection between the pump assembly 210 and the engine 202. This embodiment may be better understood in viewing the cross-sectional view 800 of the flywheel cover 212 shown in FIG. 8. The flywheel cover 212 may have a first thickness 802 that is at a first distance proximate to the opening 702 and a second thickness 804 that is at a second distance from the opening 702. The second distance may be greater than the first distance and the thickness of the flywheel cover 212 may decreasingly taper as it transitions from the first thickness 802 to the second thickness 804. The first and second thickness 802, 804 may be sufficiently sized to allow the flywheel to rotate freely without contacting the flywheel cover 212. Further, in one non-exclusive embodiment, the second thickness 804 may be sized to allow coupling mechanisms of the flywheel to be disposed within the cavity without contacting the flywheel cover 212.

Figure 8:
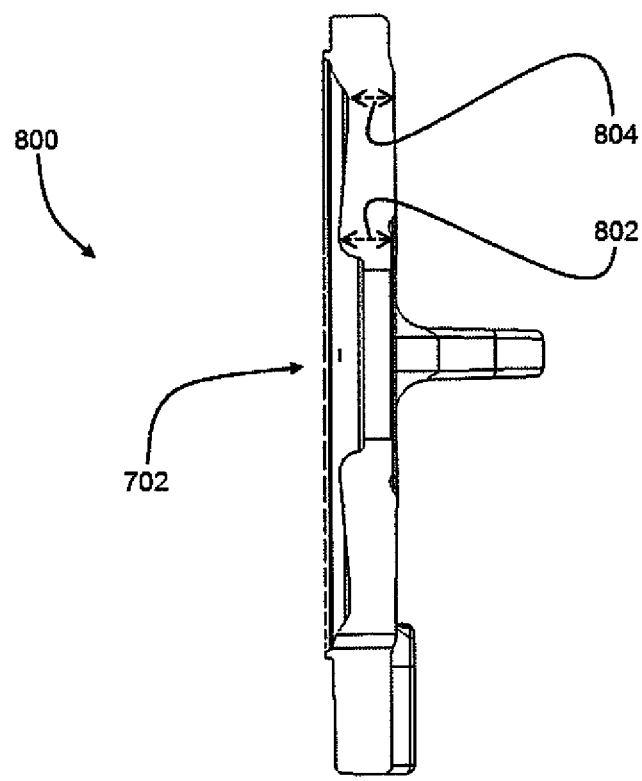
FIG. 8 is a cross sectional view of the flywheel cover of FIG. 7.

While the illustration of FIG. 8 and description above respectively show and describe the cross-section of a flywheel cover 212 having a thickness that decreasingly tapers from the first thickness 802 to the second thickness 804, this disclosure is not limited to such a configuration. Other embodiments may include changes in thickness such as in the form of a stepped change, a hyperbolic change, and any other known change. If the change in thickness were achieved in the stepped configuration, the first thickness 802 may be consistent until it reaches a location that requires a change in thickness, i.e., to accommodate coupling mechanisms on the flywheel cover 212. At that location, the thickness of the flywheel cover 212 may change in a stepped manner from the first thickness 802 to the second thickness 804. In addition, the material properties of the flywheel cover 212 may affect the rigidity of the system as well. For example, nodular iron may provide a more rigid flywheel cover 212 than grey cast iron. Accordingly, manufacturing the flywheel cover 212 of materials with differing material properties is also contemplated herein. One skilled in the art understands that the flywheel cover 212 may be constructed of aluminium, steel, stainless steel, titanium, or any other material commonly used in the art to take advantage of certain material properties, such as to increase the rigidity and strength of the flywheel cover 212.

Referring to FIG. 10, two tabs 214 are shown in an underside view 1000 of the engine cradle or body 204. While one embodiment may have two tabs 214, this disclosure provides for any number of tabs 214 and is not limited to any particular configuration. The tabs 214 may protrude from the annular body of the flywheel cover 212 and be radially spaced from one another in such a way that allows the tabs 214 to be coupled to the machine 100 via a first isolator assembly 1010 and a second isolator assembly 1012.

In one embodiment, the engine cradle or body 204 may only be coupled to the machine 100 via an isolator assembly at the coupling mechanism 216. The body 204 may further be coupled to the flywheel cover 212 and to the engine 202. The flywheel cover 212 may also be coupled to the machine 100 via isolator assemblies at the tabs 214. In this embodiment, the body 204 is coupled to the machine 100 via the coupling mechanism 216 and further coupled to both the engine 202 and the flywheel cover 212. In this configuration, the body 204, the engine 202, and the flywheel cover 212 are coupled to one another to provide a substantially rigid assembly that couples to the machine 100 via the flywheel cover tabs 214 and the coupling mechanism 216.

Figure 11:
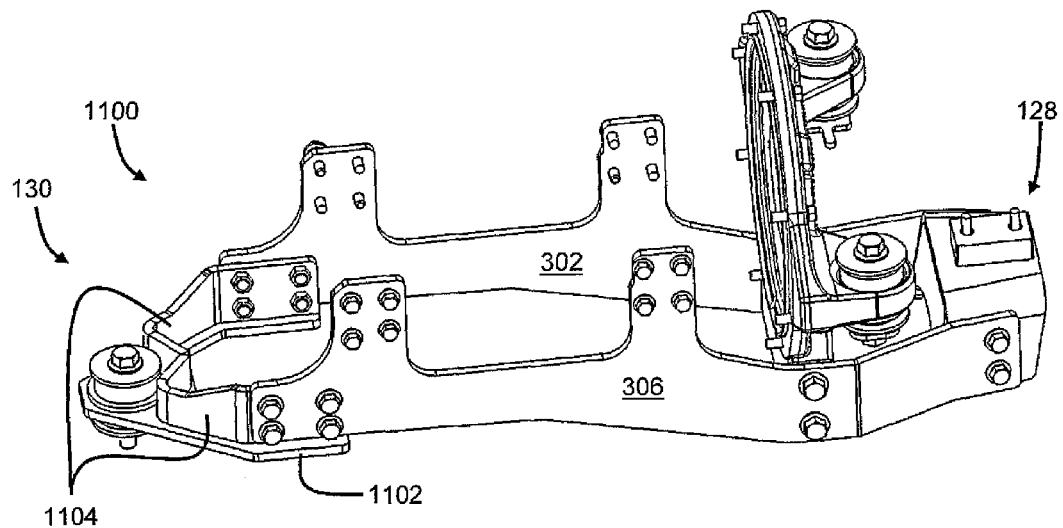
FIG. 11 is a perspective view of a different embodiment for an engine cradle assembly.

Another embodiment of an engine cradle or body 1100 is illustrated in FIG. 11. In this embodiment, a substantially planar plate 1102 may be coupled at the rear end of the cradle or body 1100 and to an underside portion of the first member 302 and second member 306. As shown, the cradle or body 1100 may include a pair of supports 1104 coupled at the rear portion of the first and second members 302, 306 and also along a top surface of the planar plate 1102. As such, the pair of supports 1104 and first and second members 302, 306 are oriented substantially perpendicular to the plate 1102. In this embodiment, the pair of supports 1104 may be coupled to the first and second members 302, 306 via a plurality of coupling methods, including, but not limited to, those previously described for the coupling mechanism 216.

The above embodiment may provide for a substantially rigid mechanical assembly to substantially reduce the likelihood of the components being exposed to extreme forces due to vibrations created by the engine or the hydraulic pump. For example, many engines create a sinusoidal vibrational input to the chassis and components coupled thereto. The sinusoidal vibration may be generated by the rotating components of the engine that are not adequately counterbalanced as they rotate therein. Additionally, any components driven by the engine may provide additional vibrational inputs to the components coupled to the chassis and engine. The particular profile of the vibration may change depending on the rotational speed of the engine and the material properties of the chassis and other components coupled to the engine. Under certain circumstances, a resonant frequency may be realized by the components coupled to the engine causing these components to experience increased stress and strain at their coupling points to other components.

The material properties, coupling locations, and dimensions of the third section 406 of the body 204 may affect the severity of the vibrations experienced by the pump assembly 210. In one nonexclusive example, insufficient rigidity between the pump assembly 210 and the engine 202 may result in a vibration profile that causes larger than desired relative movement between the engine 202, the pump assembly 210, or any of the components coupling them to one another. More specifically, if the third section 406 experiences elastic deformation due to the vibrational inputs of the engine 202 and/or pump assembly 210, the pump assembly 210 may deflect in a springboard manner relative to the engine 202.

Figure 5:
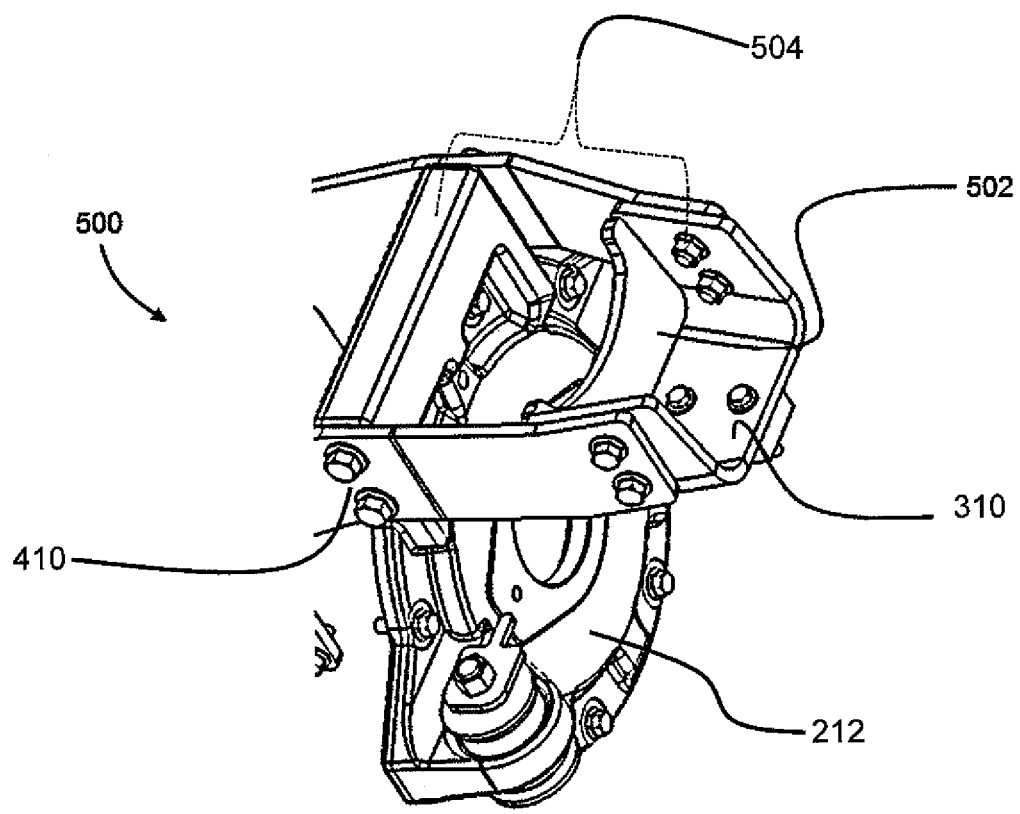
FIG. 5 is an underside partial perspective view of a pump assembly mount.

In the embodiment shown in FIG. 5, the pump assembly 210 may be coupled to the engine 202 through the pump mount 310 at a first distance 504 from the flywheel cover 212. In this non-limiting embodiment, the first distance 504 from the flywheel cover 212, in addition to coupling the body 204 to the flywheel cover 212 at the flywheel coupling point 410, may provide sufficient rigidity between the pump assembly 210 and the engine 202 to restrict any substantial deflection in the body 204 along the third section 406. By providing sufficient rigidity between the body 204, the pump assembly 210, and the engine 202, the deflection of the pump assembly 210 caused by the vibration profiles generated by the engine 202 and/or pump assembly 210 may be substantially reduced.

A different embodiment is shown where the pump mount 610 is at a second distance 602 from the flywheel cover 212 in FIG. 6. In this embodiment, the second distance 602 from the flywheel cover 212 may be greater than the first distance 504 from the flywheel cover 212. By increasing the distance between the pump mount 610 and the flywheel cover 212, a potential bending moment at the pump assembly 210 may be increased. That is to say, the pump assembly 210 may be exposed to a greater bending moment the further the pump assembly 210 and pump mount 610 extend from the engine 202. In one non-limiting example, the pump assembly 210 may have a tendency to greater deflection relative to the engine 202 the further the pump mount 610 is from the flywheel cover 212.

In the embodiment of FIG. 6, it may be necessary to increase the rigidity of the third section 406 by altering the material properties of the body 204. In one non-limiting example, the body may require an increase in thickness to sufficiently support the pump assembly 210 at the second distance from the flywheel cover 602. Further still, this embodiment may also utilize the flywheel cover 212 with a varying thickness as shown in FIG. 8 to address the increased potential for deflection between the engine 202 and the pump assembly 210.

Accordingly, the body 204 provides substantial structural rigidity between the pump assembly 210 and the engine 202 to restrict or reduce deflection between the pump assembly 210 and the engine 202. Further, this disclosure teaches providing multiple locations of a pump mount relative to a flywheel cover and the teachings provided herein should not be limited to any particular location of the pump mount. These teachings are also equally applicable to any other component that may be mounted to an engine or a chassis. For example, instead of mounting a pump assembly to the engine, a transmission may be mounted thereto. The transmission may be mounted to a transmission mount along the body 204 utilizing the teachings of this disclosure. Accordingly, this disclosure should not be limited in application to only a pump assembly but should be considered applicable to any component that may be coupled to, and/or driven by, an engine.

In one embodiment, the body may provide for a sufficient structural base to substantially restrict the pump assembly from resonating as a result of the vibrations created by the running engine. Further still, in one embodiment the thickened portion of the flywheel cover may substantially restrict deflection between the pump assembly and the flywheel cover. In yet another embodiment, it may not be necessary to thicken the flywheel for deflection purposes.

Figure 9:
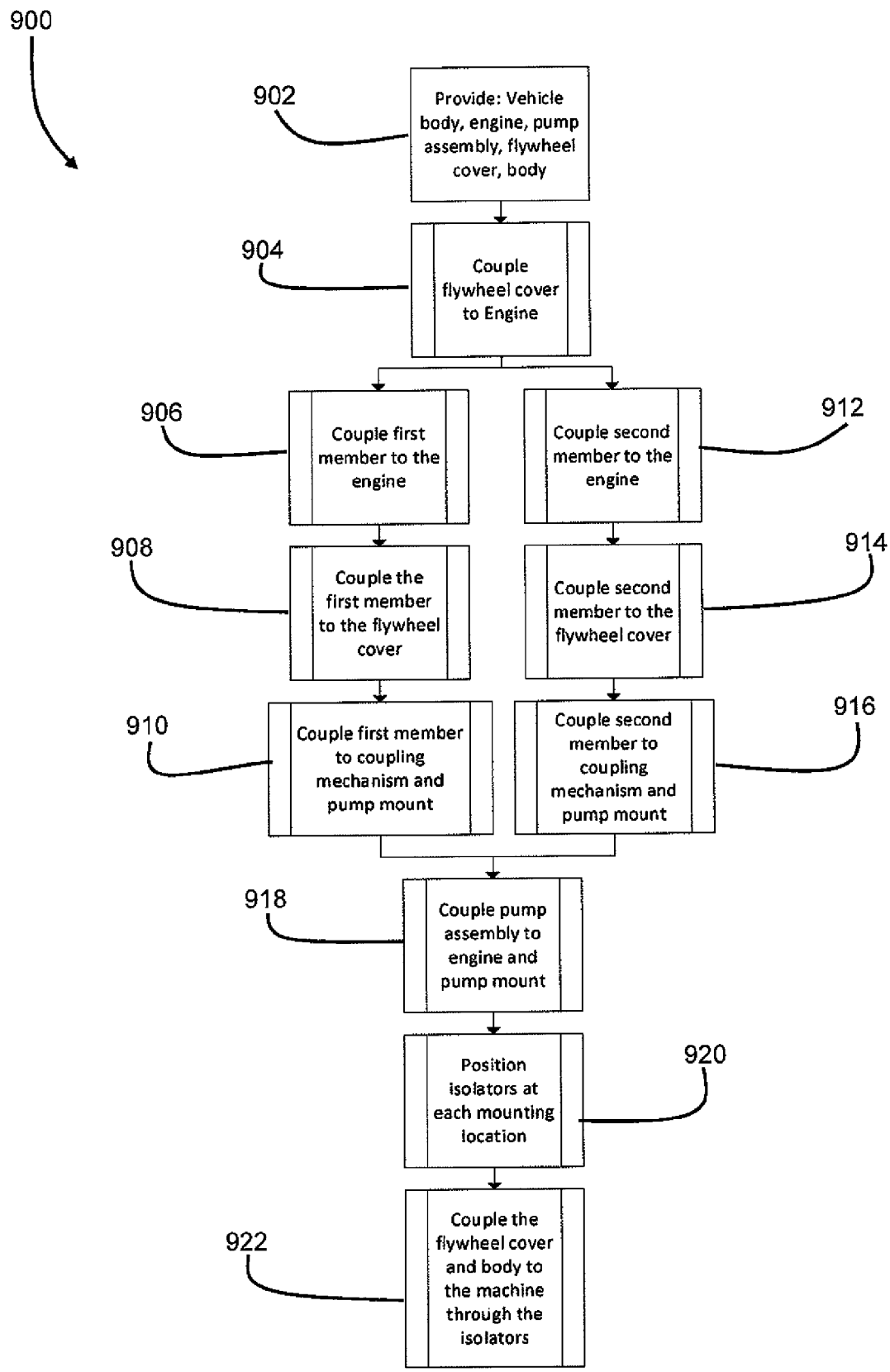
FIG. 9 is a flowchart showing an engine mounting assembly process.

Referring now to FIG. 9, an engine mounting assembly process is shown in a block diagram 900. In one aspect of the present disclosure, the machine 100 and the engine 202 may be provided as shown in block 902. The flywheel cover 212 may be coupled to the engine 202 in block 904. Next, in block 906, the first member 302 may be coupled to the engine 202. In block 908, the first member 302 may be coupled to the flywheel cover 212. The first member 302 may further be coupled to the coupling mechanism 216 at one end and to the pump mount 310 at the other end in block 910.

Similarly, the second member 306 may be coupled to the engine 202 in block 912. The second member 306 may also be coupled to the flywheel cover 212 in block 914. In block 916, the second member 306 may further be coupled to the coupling mechanism 216 at the rear end 130 and to the pump mount 310 towards the front end 128.

In block 918, the pump assembly 210 may be coupled to the pump mount 310 and the flywheel cover 212 along the mounting surface 704. The first and second isolator assemblies 1010, 1012 (FIG. 10) may then be placed at the tabs 214 of the flywheel cover 212 and the third isolator assembly 324 may be placed at the coupling mechanism 216 in block 920. In block 922, the engine 202, flywheel cover 212, and body 204 may be placed in the machine 100 so that the tabs 214 and the coupling mechanism 216 are aligned to allow the body 204 and the flywheel cover 212 to be coupled to the machine 100 through the corresponding isolator assemblies 1010, 1012, 324.

While this assembly process has been described in the above manner, one having skill in the art understands that the assembly steps described herein may be performed in a plurality of different orders. For example, the body 204 may be coupled to the machine 100 prior to being coupled to the engine 202 or the flywheel cover 212. Accordingly, this disclosure is not limited to any particular assembly order.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cradle assembly for mounting an engine and a pump assembly to a machine, comprising:
   a body including a front end, a rear end, a first side, and a second side, the body having a length defined between its front end and rear end;
   a first elongated member disposed along the first side of the body between the front end and the rear end, the first elongated member including a length defined between a first end and a second end thereof;
   a second elongated member disposed along the second side of the body between the front end and the rear end, the second elongated member including a length defined between a first end and a second end thereof;
   a pump mount positioned at a terminating end of the front end of the body and coupled between the first member and the second member, the pump mount adapted to be coupled to the pump assembly;
   a flywheel cover coupled between the first member and the second member at a location between the front end and the rear end, the flywheel cover adapted to be coupled to the engine; and
   a coupling mechanism disposed at the rear end of the body and coupled at the second end of the first elongated member and at the second end of the second elongated member, the coupling mechanism including a through hole adapted to be coupled to a chassis of the machine;
   wherein, the first elongated member includes at least one transverse bend tapered inwardly toward the second end of the second elongated member and defined along its length at a location between the front end and the rear end, and the second elongated member includes at least one transverse bend tapered inwardly toward the second end of the first elongated member and defined along its length at a location between the front end and the rear end; and
   wherein the first elongated member and the second elongated member converge inwardly toward the pump mount which is longitudinally aligned with the through hole of the coupling mechanism.

2. The cradle assembly of claim 1, further comprising a first isolator assembly and a second isolator assembly, the first isolator assembly being coupled to the flywheel cover and the second isolator assembly being coupled to the coupling mechanism, wherein the first isolator assembly is adapted to isolate the flywheel cover from the machine and the second isolator assembly is adapted to isolate the body from the machine.

3. The cradle assembly of claim 2, wherein the coupling mechanism comprises:
   a substantially planar plate coupled to the second isolator assembly;
   a first wall integrally formed with the plate and being oriented at an angle with respect to the plate, the first wall coupled to the first elongated member; and
   a second wall integrally formed with the plate and being oriented at an angle with respect to the plate, the second wall coupled to the second elongated member;
   wherein, the first wall and second wall taper inwardly towards one another at the rear end of the body.

4. The cradle assembly of claim 3, wherein the first wall and the second wall each comprise a defined length, the first wall and second wall further including a transverse bend defined at a location along its respective length.

5. The cradle assembly of claim 3, wherein the first wall and the second will comprise at least two transverse bends defined therein along each respective length;
   further wherein, the second isolator assembly is disposed between the front end of the body and the first and second side walls.

6. The cradle assembly of claim 1, wherein:
   the first elongated member comprises a plurality of sections including at least a first section, a second section and a third section; and
   the second elongated member comprises a plurality of sections including at least a first section, a second section, and a third section;
   further wherein, the second section of the first elongated member and the second section of the second elongated member are disposed substantially parallel to one another.

7. The cradle assembly of claim 6, wherein the first section of the first elongated member and the first section of the second elongated member are coupled to the coupling mechanism at the rear end of the body;
   further wherein, the first section of both elongated members taper inwardly from the respective second section of each elongated member towards the rear end.

8. The cradle assembly of claim 6, wherein the third section of the first elongated member and the third section of the second elongated member are coupled to the pump mount at the front end of the body;
   further wherein, the third section of both elongated members taper inwardly from the respective second section of each elongated member to the pump mount.

9. The cradle assembly of claim 6, wherein the flywheel cover is coupled to the second section of both the first elongated member and the second elongated member.

10. A cradle assembly for mounting an engine and a pump assembly to a machine, comprising:
    a body including a front end, a rear end, a first side, and a second side, the body having a length defined between its front end and rear end;
    a first elongated member disposed along the first side of the body between the front end and the rear end, the first elongated member including a length defined between a first end and a second end thereof;
    a second elongated member disposed along the second side of the body between the front end and the rear end;
    a pump mount positioned at the front end of the body and coupled between the first member and the second member, the pump mount adapted to be coupled to the pump assembly;
    a flywheel cover coupled between the first member and the second member at a location between the front end and the rear end, the flywheel cover adapted to be coupled to the engine; and
    a coupling mechanism disposed at the rear end of the body, and coupled between the first member and the second member, the coupling mechanism adapted to be coupled to a chassis of the machine;
    wherein, the first elongated member includes at least one transverse bend defined along its length at a location between the front end and the rear end, and the second elongated member includes at least one transverse bend defined along its length at a location between the front end and the rear end; and
    wherein the flywheel cover comprises a substantially annular body defining an opening therein, the annular body having a first thickness spaced from the opening by a first distance and a second thickness spaced from the opening by a second distance;

further wherein, the first thickness is greater than the second thickness, and the first distance is less than the second distance.

11. The cradle assembly of claim 10, wherein the thickness of the annular body decreasingly tapers from the first thickness to the second thickness.

12. The cradle assembly of claim 10, further comprising a first isolator assembly, a second isolator assembly, and a third isolator assembly, the third isolator assembly being coupled to the coupling mechanism and adapted to isolate the body from the machine;

wherein, the flywheel cover comprises a pair of tabs protruding from the annular body and being radially spaced from one another, where one of the pair of tabs is coupled to the first isolator assembly and the other of the pair of tabs is coupled to the second isolator assembly, the first and second isolator assemblies adapted to isolate the flywheel cover from the machine.

13. A cradle assembly for mounting an engine and pump assembly to a chassis of a work machine, comprising:

an elongated body having a front end and a rear end, the body having a defined length between its front end and rear end;

a first member disposed along one side of the body between the front end and the rear end;

a second member disposed along another side of the body between the front end and rear end, the second member spaced laterally from the first member;

a pump mount coupled at the front end to the first member and the second member, the pump mount adapted to be coupled to the pump assembly;

a coupling mechanism coupled to the first and second members at the rear end of the body, the coupling mechanism adapted to be coupled to the chassis;

a flywheel cover adapted to be coupled to the engine, the flywheel cover coupled between the first member and the second member at a location along the body between the front and rear ends, the flywheel cover including an annular body defining an opening therethrough, wherein a longitudinal axis is defined along the length of the elongated body and through the opening between the front end and rear end; and a first isolator assembly and a second isolator assembly, the first isolator assembly being coupled to the coupling mechanism and adapted to isolate the body from the chassis, and the second isolator assembly being coupled to the flywheel cover and adapted to isolate the flywheel cover from the chassis.

14. The cradle assembly of claim 13, wherein the annular body comprises a first thickness spaced radially from the opening by a first distance and a second thickness spaced radially from the opening by a second distance, the first thickness being greater than the second thickness, and the first distance being less than the second distance;

further wherein, the thickness of the annular body decreasingly tapers from the first thickness to the second thickness.

15. The cradle assembly of claim 14, wherein the first member and the second member are integrally formed as a single structural member that interconnects the pump mount and the coupling mechanism.

16. The cradle assembly of claim 13, wherein:

the flywheel cover comprises a pair of tabs protruding from the annular body and being radially spaced from one another; and the second isolator assembly comprises at least two second isolator assemblies, wherein one of the pair of tabs is coupled to one of the two second isolator assemblies and the other of the pair of tabs is coupled to the other of the two second isolator assemblies.

17. The cradle assembly of claim 13, wherein:

the first member comprises a plurality of sections including at least a first section, a second section and a third section;

the second member comprises a plurality of sections including at least a first section, a second section, and a third section;

further wherein, the second section of the first member and the second section of the second member are disposed parallel to one another.

18. The cradle assembly of claim 17, wherein:

the first section of each member tapers outwardly from the coupling mechanism to the respective second section of each member; and the third section of each member tapers inwardly from the second section of each member to the pump mount.

19. A work machine, comprising:

a chassis;

at least one ground-engaging mechanism coupled to the chassis;

a cab mounted to the chassis;

an engine assembly for providing power to propel the machine, the engine assembly including at least a flywheel and a crankshaft;

a pump assembly coupled to an output of the engine assembly; and a cradle assembly comprising:

a body including a front end, a rear end, a first side, and a second side, the body having a length defined between its front end and rear end;

a first elongated member disposed along the first side of the body between the front end and the rear end;

a second elongated member disposed along the second side of the body between the front end and the rear end;

a pump mount positioned at the front end of the body and coupled between the first member and the second member, where the pump assembly is coupled to the pump mount;

a flywheel cover coupled between the first member and the second member at a location between the front end and rear end, where the engine assembly is coupled to the flywheel cover and the flywheel operably rotates within a cavity defined between the engine assembly and the flywheel cover; and a coupling mechanism disposed at the rear end of the body and coupled between the first member and the second member, where the cradle assembly is coupled to the chassis via the coupling mechanism;

wherein, the first elongated member includes at least one transverse bend defined along its length at a location between the front end and the rear end, and the second elongated member includes at least one transverse bend defined along its length at a location between the front end and the rear end.

20. The machine of claim 19, wherein the flywheel cover comprises a substantially annular body defining an opening therein for receiving at least a portion of the engine assembly, the annular body having a first thickness spaced radially from the opening by a first distance and a second thickness spaced radially from the opening by a second distance, where the first thickness is greater than the second thickness and the first distance is less than the second distance;

further wherein, the thickness of the annular body decreasingly tapers from the first thickness to the second thickness.

* * * * *